US008227525B2

(12) United States Patent
Bisson et al.

(10) Patent No.: US 8,227,525 B2
(45) Date of Patent: Jul. 24, 2012

(54) PROCESS, COMPOSITION AND INK

(75) Inventors: Adrian Peter Bisson, Manchester (GB); Charles Rupert McIntyre, Stirlingshire (GB); Gary Cuthbertson, Stirlingshire (GB); Richard John Stuart Allan Cordwell, Manchester (GB); Tom Annable, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 531 days.

(21) Appl. No.: 12/444,174

(22) PCT Filed: Oct. 4, 2007

(86) PCT No.: PCT/GB2007/003760
§ 371 (c)(1),
(2), (4) Date: Apr. 3, 2009

(87) PCT Pub. No.: WO2008/043984
PCT Pub. Date: Apr. 17, 2008

(65) Prior Publication Data
US 2010/0092737 A1      Apr. 15, 2010

(30) Foreign Application Priority Data

Oct. 11, 2006  (GB) .................................. 0620089.3
Jun. 7, 2007   (GB) .................................. 0710918.4

(51) Int. Cl.
*C09D 11/00* (2006.01)
(52) U.S. Cl. ..... 523/160; 523/161; 523/324; 428/195.1; 524/560
(58) Field of Classification Search ................... 523/160
See application file for complete search history.

(56) References Cited

U.S. PATENT DOCUMENTS

| 4,814,082 | A  | * | 3/1989  | Wrasidlo ...................... 210/490 |
| 6,328,894 | B1 | * | 12/2001 | Chan et al. ................... 210/638 |
| 6,406,139 | B1 | * | 6/2002  | Suzuki et al. ................. 347/100 |
| 2003/0195274 | A1 |  | 10/2003 | Nakamura |
| 2004/0229974 | A1 |  | 11/2004 | Miyabayashi ................ 523/160 |
| 2005/0075416 | A1 |  | 4/2005  | Miyabayashi |
| 2005/0176877 | A1 |  | 8/2005  | Miyabayashi ................ 524/556 |

FOREIGN PATENT DOCUMENTS

| EP | 1375607         |   | 1/2004 |
| WO | WO 00/20520     |   | 4/2000 |
| WO | WO 2005/056700  | * | 6/2005 |
| WO | WO 2005/061087 A1 |  | 7/2005 |
| WO | WO 2006/064193  | * | 6/2006 |
| WO | WO 2006/076636  |   | 7/2006 |

* cited by examiner

*Primary Examiner* — Doris Lee
(74) *Attorney, Agent, or Firm* — Morgan, Lewis & Bockius LLP

(57) ABSTRACT

A process for purifying a composition comprising:
  i) an encapsulated pigment comprising a pigment and an encapsulant material comprising a cross-linked dispersant;
  ii) a liquid medium; and
  iii) free dispersant;
said process comprising removal of at least some free dispersant from the composition using a membrane having a molecular weight cut-off of 3 to 30 times the weight average molecular weight of the dispersant prior to cross-linking, with the proviso that all of conditions a), b) and c) are met:
  a) the pigment is not silicon dioxide;
  b) the cross-linked dispersant is not cross-linked polyethyleneimine; and
  c) the cross-linked dispersant is not a dispersant which has been cross-linked with bis-ethene,1,1'-[methylene bis (sulfonyl)].

11 Claims, No Drawings

PROCESS, COMPOSITION AND INK

This invention relates to a process for improving the stability of encapsulated pigment dispersions, to compositions comprising the resultant pigment dispersions and to various uses of such compositions, especially in the field of ink jet printing.

Ink jet printing (IJP) is a non-impact printing technique in which numerous droplets of ink are rapidly ejected through tiny nozzles of a print head onto a substrate to form an image without bringing the nozzles into contact with the substrate. Ink jet printing inks typically comprise a liquid medium and either a soluble dye or an insoluble pigment.

Generally, IJP inks containing a soluble dyes have better stability than the pigment-based inks. Thus, for pigment-based IJP inks, it is important to ensure the pigment is stably dispersed in the liquid medium. Poor dispersion stability may result in flocculation and/or precipitation of the pigment during storage of the ink prior to printing and/or during operation of the inkjet printer. Any such flocculation or precipitation can produce oversized particles which tend to block the fine nozzles of the ink jet printer. In this case prints may begin to show undesirable defects such as missing lines because the firing becomes inconsistent or erratic. Poor dispersion stability may also result in the viscosity of the ink rising during storage or printing. Such a rise in viscosity may have adverse affects, for example on droplet volume. In this case prints may show poor optical density if smaller droplets are ejected.

In some cases, the effects of nozzle blockage or viscosity rise may result in a failure to print an image of reasonable quality and in severe cases this can be irreversible and render the ink and the ink jet print head useless. When the print head is integral with the printer, rather than the cartridge, the cost of an irreversibly blocked print head can be very high. The extent to which print quality is maintained during printing is often referred to as "operability", with good operability meaning that the print quality is maintained over extended use periods.

One approach to improve the stability of a pigment in a liquid medium is to encapsulate the pigment in a cross-linked dispersant. Examples of this approach are described in EP 1,123,358, WO 2005/056700 and WO 2005/061087.

US 2005/0075416, US2005/0176877, US 2004/0229974 and US 2003/0195274 disclose encapsulated pigment-based inks which may be purified by techniques such as ultrafiltration. The purification is stated in US 2005/0075416 to improve the viscosity and print density of such ink. However, none of these documents disclose the ultrafilters used or the conditions employed.

PCT patent publication WO 2006/076636 describes encapsulated particles which are stable under physiological conditions.

For inks used in thermal ink jet printers it is desirable that the amount of kogation of the thermal resistor is minimised so that print quality is maintained over longer periods.

Also, it is desirable that the optical density of prints is high.

We have found that by the careful selection of the molecular weight cut-off of the membrane in relation to the dispersant molecular weight a much improved rate and in some embodiments efficiency of purification is achieved. That is to say the free dispersant may be removed more quickly and in some embodiments to lower residual levels than previously known in the art. Thus, the present invention offers a more efficient process by which one or more of the abovementioned advantages may be achieved.

According to a first aspect of the present invention there is provided a process for purifying a composition comprising:
i) an encapsulated pigment comprising a pigment and an encapsulant material comprising a cross-linked dispersant;
ii) a liquid medium; and
iii) free dispersant;
said process comprising removal of at least some free dispersant from the composition using a membrane having a molecular weight cut-off of 3 to 30 times that of the weight average molecular weight of the dispersant prior to cross-linking.

The term "cross-linkable dispersant" as used herein means the dispersant prior to cross-linking. That is to say the dispersant prior to becoming cross-linked.

The words "a" and "an" where appropriate and unless stated otherwise mean "at least one". Thus, for example "an" encapsulated pigment means "at least one" encapsulated pigment and "a" cross-linked dispersant means "at least one" cross-linked dispersant.

Preferably, the molecular weight cut-off (MWC) of the membrane is 3 to 25, more preferably 5 to 20, and especially 7 to 20 times the weight average molecular weight of the cross-linkable dispersant. In some embodiments the MWC of the membrane is preferably from 5 to 30, more preferably from 7 to 30 and especially from 10 to 30 times the weight average molecular weight of the cross-linkable dispersant. If the MWC of the membrane is too high we have found problems in that the pigment may blind the membrane (i.e. block the membrane pores) and thereby prevent or inhibit successful purification of the composition. Also, if the MWC is too low with respect to the weight averaged molecular weight of the cross-linkable dispersant we have found that some of the dispersant which has grown in molecular weight because of cross-linking, but which is still free dispersant, may blind the membrane or may not go through the membrane. Accordingly, by very carefully selecting these parameters we have found the purification process is improved.

Removal of the free dispersant using the membrane is preferably performed by a process comprising contacting the composition with the membrane such that the encapsulated pigment is retained on one side of the membrane and free dispersant passes through the membrane. In this embodiment free dispersant passes through the membrane to become the permeate, which may be discarded, and the encapsulated pigment is retained as the retentate. If desired, the retentate may be diluted with further liquid medium during the process to avoid the retentate becoming too viscous.

Preferably the membrane is a microfilter, ultrafilter or a nanofilter having the specified MWC.

The membrane preferably has an MWC of 50,000 to 1,000,000 daltons, more preferably 100,000 to 700,000 daltons and especially 200,000 to 400,000 daltons, provided that the MWC has the abovementioned relationship to the weight average molecular weight of the cross-linkable dispersant. In some embodiments the membrane has an MWC of from 100,000 to 1,000,000, more preferably from 200,000 to 1,000,000 and especially 300,000 to 1,000,000.

The MWC value is often specified by the manufacturer of the membrane. The MWC value may be experimentally determined by use of compounds of known molecular weight. Such compounds of known molecular weight may be proteins, saccharides or more preferably polyacrylic acid polymers. It is preferred that these compounds have a distribution of molecular weights which is essentially monodispersed. In other words, these compounds can be adequately characterised by a single molecular weight value. In a preferred method the MWC value for any membrane can be determined experimentally by attempting to pass aqueous solutions containing polyacrylic acid polymers of different molecular weights through the membrane. The MWC value of the membrane corresponds to the lowest molecular weight of polyacrylic acid which is at least 90% by weight retained by the membrane. Alternatively, the American Society for Testing and Materials (ASTM) method E1343-90 (2001) can be used to determine the MWC value for the membrane. Some membrane manufacturers quote a pore size rather than an MWC value. The correlation between pore size and MWC values is complex and is influenced by, among other things, the nature of the membrane itself. As a rough guide the relationship between pore size and MWC value is summarised in Table A.

TABLE A

| MWC (approximate) | Pore Size/microns |
|---|---|
| 10000 | 0.005 |
| 20000 | 0.01 |
| 100000 | 0.05 |
| 200000 | 0.1 |
| 500000 | 0.3 |

However, we prefer to determine the MWC values experimentally using the methods described above.

Preferably the membrane has an MWC of no more than 1,000,000 and the pore size is no more than 0.5 microns, more preferably no more than 0.3 microns and especially no more than 0.2 microns. We have found this constraint very much assists in preventing or inhibiting the pigment from blinding the membrane.

It is preferred that the membrane has an MWC which is selected such that, in addition to the abovementioned relationship to the weight average molecular weight of the cross-linkable dispersant, at least 90%, more preferably at least 95%, especially at least 99% and most especially at least 99.5% by weight of the encapsulated pigment is retained by the membrane. In this way less of the encapsulated pigment is lost through the membrane thereby achieving a higher yield of the purified encapsulated pigment.

Preferred membranes are available commercially from suppliers such as Alfa-Laval/DSS, Sartorious, Whatman, GE Osmonics and ITT Sanitaire.

The membrane may be in any suitable form, for example in the form of a tube or a flat sheet.

Preferably the membrane is or comprises a ceramic, polyester, fluoropolymer, polyimide or, more preferably, polyether sulfone or polysulfone layer.

The process of preparing the encapsulated pigment is not required by the present invention or by the claims.

Preferably the encapsulated pigment is obtained by cross-linking the cross-linkable dispersant in the presence of a pigment, more preferably by cross-linking the cross-linkable dispersant in the presence of the pigment and the liquid medium. Preferably the pigment is dispersed uniformly with the cross-linkable dispersant in the liquid medium. During the cross-linking a dispersant shell may be formed around the pigment.

In one embodiment the process of preparing the encapsulated pigment forms part of the process according to the first aspect of the present invention.

Preferably, the encapsulant material is cross-linked such that it is substantially insoluble in any solvent. Preferably, the encapsulant material has a solubility of less than 10%, more preferably less than 5% by weight in tetrahydrofuran. Preferably, the encapsulant material is not a linear polymer. Preferably, the encapsulant material is a cross-linked polymer having a molecular weight which is too high to be measured. For example it is cross-linked to such an extent that Gel Permeation Chromatography cannot establish a molecular weight.

Preferably, the encapsulated pigment has a d90 volume average particle size of from 10 nm to 1000 nm, more preferably from 20 to 300 nm, and especially from 50 nm to 200 nm.

The free dispersant in the composition typically is and/or is derived from the dispersant used to form the encapsulant material. The cross-linking is believed to form linear or branched structures or even micro-gel structures, depending on the conditions and reagents used. Some of the free dispersant may be uncross-linked because, for example, not all of the dispersant has reacted with a cross-linking agent.

While not wishing to be limited to any one theory, treatment of the un-crosslinked dispersant with a cross-linking agent in order to encapsulate the pigment may result in the desired encapsulated pigment together with unwanted free dispersant comprising unreacted, un-crosslinked dispersant and dispersant which has cross-linked to various degrees without actually encapsulating any pigment. We have found that careful selection of the membrane's MWC is important for efficient removal of free dispersant after the pigment has been encapsulated.

Preferably the encapsulated pigment is dispersed uniformly in the liquid medium.

The pigment (i.e. the pigment part of the encapsulated pigment) may comprise and preferably is an inorganic or organic pigment or a mixture comprising two or more such pigments. The pigment is substantially insoluble in the liquid medium, preferably having a solubility in the liquid medium of less than 1% by weight.

The pigment is preferably, selected from those listed in the Colour Index International.

Preferred organic pigments include azo (including disazo and condensed azo), thioindigo, indanthrone, isoindanthrone, anthanthrone, anthraquinone, isodibenzanthrone, triphendioxazine, quinacridone and phthalocyanine pigments, especially copper phthalocyanine pigments and their nuclear halogenated derivatives. Preferred organic pigments are phthalocyanines (especially copper phthalocyanine pigments), azo pigments, indanthrone, anthranthrone, and quinacridone pigments.

Preferred inorganic pigments include carbon black, titanium dioxide, aluminium oxide, silicon dioxide, chromium oxide, iron oxide, cobalt oxide and iron sulphide.

In one embodiment the pigment is not silicon dioxide.

The pigment is preferably cyan, yellow, magenta or black in colour.

Preferably, the pigment prior to being encapsulated has d90 volume average particle size of 10 nm to 1000 nm, more preferably from 20 to 300 nm, and especially from 50 nm to 200 nm. A preferred method for measuring the particle size is by laser scattering. Suitable equipment for measuring the average particle size is available from suppliers such as Malvern and Coulter.

The liquid medium may be non-polar but is preferably polar.

Examples of suitable polar liquid media include ethers, glycols, alcohols, polyols, amides, water and mixtures thereof.

Preferably the liquid medium is or comprises water because this often results in a particularly stable and fine encapsulated pigments. Preferably, the liquid medium comprises 1 to 100%, more preferably, 70 to 100%, especially 90 to 100% water by weight. The remainder of the liquid medium preferably comprises one or more polar organic liquids, preferably selected from water-miscible organic liquids More preferably the only liquid in the liquid medium is water.

The liquid medium may be in the form of a multi phase liquid (e.g. a liquid-liquid emulsion) but is preferably in the form of a single phase (homogeneous) liquid.

Preferred water-miscible organic liquids include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide and dimethylacetamide; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol; oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably, mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; and mixtures comprising two or more of the foregoing.

In one embodiment the liquid medium comprises water and 2 or more, especially from 2 to 8, water-miscible organic liquids.

The weight ratio of water to water-miscible organic liquid when both are present in the liquid medium is preferably 99:1 to 5:95, more preferably 95:5 to 50:50, especially 95:5 to 75:25.

The encapsulant material comprising cross-linked dispersant may be formed by cross-linking a cross-linkable dispersant in the presence of a pigment. This cross-linked dispersant is preferably derived from a self cross-linkable dispersant or, more preferably, from a dispersant having groups which may be cross-linked with a cross-linking agent. For example the self cross-linkable dispersant may contain a group or a combination of groups which allows molecules of the dispersant to cross-link with other molecules of the dispersant without the need for an additional cross-linking agent. These dispersants may be self cross-linked by means of, for example heating.

More preferably, the cross-linked dispersant is derived from the reaction of a cross-linkable dispersant having cross-linkable groups with a cross-linking agent. Examples of such cross-linkable groups are disclosed in EP 1,123,358 at page 5, Table 1 and WO 2005/061087 page 6, Table 1. Preferably, the cross-linkable groups are selected from hydroxy, —C(O)— (especially ketone, aldehyde and beta-diketoester) and more preferably, carboxylic acid groups.

In either of the two cross-linking approaches mentioned above, the cross-linkable dispersant preferably has at least two cross-linkable or self cross-linkable groups per molecule.

Preferably, the cross-linked dispersant is not a dispersant which has been cross-linked with bis-ethene,1,1'-[methylene bis(sulfonyl)].

Initially in our investigation we found that removing free dispersant by membrane purification was surprisingly difficult, particularly when compared to the ease with which we were able to remove low molecular weight reactive surfactants from analogous compositions. We speculate that the reason for this may be because when the molecular weight of the cross-linkable dispersant is high it becomes even harder to select a membrane with an appropriate MWC which does not also blind (become blocked) with the smaller pigment particles and/or higher molecular weight cross-linked free dispersant. However, by selecting a membrane having the above-mentioned relationship between MWC and the weight average molecular weight of the dispersant prior to cross-linking much easier removal of free dispersant was discovered.

The cross-linkable dispersant may be monomeric but is preferably polymeric in nature. Preferably the cross-linkable dispersant has a weight average molecular weight of from 1,000 to 100,000, more preferably from 5,000 to 100,000, especially from 5,000 to 70,000 and most especially from 10,000 to 50,000. Preferably the weight average molecular weight is measured by gel permeation chromatography (GPC). Preferably, the molecular weight standards used for GPC are polystyrene standards. The solvent used in GPC is preferably tetrahydrofuran (THF) or dimethyl formamide (DMF).

The cross-linkable dispersant preferably is or comprises a polyurethane, polyester or, more preferably, a polyvinyl polymer. Preferably, the cross-linkable dispersant is or comprises a (meth)acrylate, a styrene or a (methyl)acrylate-co-styrene polymer.

Preferably the cross-linkable dispersant does not polymerise when exposed to free radicals, more preferably the cross-linkable dispersant does not contain unsaturated groups (e.g. alkene and/or alkyne groups).

The cross-linkable dispersant may be a homopolymer but is preferably a copolymer. The cross-linkable dispersant is preferably a copolymer obtained by polymerising at least one monomer containing one or more hydrophilic group(s) (especially —$CO_2H$, —$SO_3H$, —$PO_3H_2$, —OH or polyethyleneoxide) and at least one monomer which is free from such hydrophilic groups. Where the dispersant has acid groups (e.g. —$CO_2H$, —$SO_3H$, —$PO_3H_2$) these may be in the form of the free acid or more preferably in the form of a salt. Preferred salts forms are those with metal ions (especially alkali metal ions), ammonium and substituted ammonium ions.

The cross-linkable dispersant is preferably an alternating or random polymer (e.g. having statistically short blocks or segments) or a block or graft polymer (e.g. having longer blocks or segments). The cross-linkable dispersant can be a branched or star polymer but is preferably a linear polymer. The cross-linkable dispersant may be a polymer having two or more segments but preferably it is a polymer having no segments.

The cross-linkable dispersant may have cationic groups but it preferably has anionic and/or non-ionic groups. In one embodiment, the cross-linkable dispersant is free from cationic groups. In one embodiment, the cross-linkable dispersant is free from amine groups. In one embodiment, the cross-linkable dispersant is not polyethyleneimine.

Preferably, the dispersant comprises anionic groups, especially those selected from —$CO_2H$, —$SO_3H$ and —$PO_3H_2$ groups and mixtures thereof.

Most preferably, the dispersant comprises —$CO_2H$ groups.

When the cross-linkable dispersant comprises non-ionic groups these are preferably —OH and/or polyethyleneoxide groups.

Preferably the cross-linkable dispersant is as described in PCT patent application WO 2006/064193.

The cross-linking agent, when used, has cross-linking groups capable of reacting with the cross-linkable dispersant.

Examples of cross-linking groups carried by the cross-linking agent and suitable pairings with compatible cross-linkable groups on the dispersant are disclosed in EP 1,123,358 at page 5, Table 1 and WO 2005/061087 page 6, Table 1, which is incorporated herein by reference thereto.

The preferred pairings of cross-linking and cross-linkable groups are as indicated in Table 1:

TABLE 1

| Cross-linkable group in the cross-linkable dispersant | Cross-linking groups in the cross-linking agent |
| --- | --- |
| carboxylic acid | epoxy |
| hydroxy | isocyanate |
| keto, aldehyde and beta-diketo | amine, imine, hydrazine and hydrazide |

Preferably, the cross-linking agent does not contain vinyl groups, especially not vinyl sulfonyl groups. Preferably, the cross-linking agent is not bis-ethene,1,1'-[methylene bis(sulfonyl)].

The cross-linking agent may be insoluble or partially soluble in the liquid medium but, preferably, it is substantially soluble in the liquid medium. By substantially soluble it is meant that minor amounts (e.g. less than 1% by weight of the cross-linking agent) may be insoluble in the liquid medium.

The cross-linking agent preferably has two or more (preferably 2, 3 or 4) cross-linking groups per molecule. Preferred cross-linking agents include di-, tri and tetra-amines, isocyanates and epoxides.

The cross-linking agent is preferably not a dispersant. That is to say that the cross-linking agent could not adequately be used to disperse the pigment in a liquid medium.

In a preferred embodiment the cross-linkable dispersant has a weight average molecular weight of from 5,000 to 100,000 and the pigment which is encapsulated therein has a d90 volume average particle size of from 50 to 200 nm.

In a more preferred embodiment the cross-linkable dispersant has a weight average molecular weight of from 5,000 to 70,000, the pigment which is encapsulated therein has a d90 volume averaged particle size of from 50 to 200 nm and the MWC of the membrane is from 5 to 20 times the weight average molecular weight of the dispersant prior to cross-linking.

Preferably, in the process according to the first aspect of the present invention at least one, or more preferably all the following conditions a), b) and c) are met:
  a) the pigment is not silicon dioxide;
  b) the cross-linked dispersant is not cross-linked polyethyleneimine; and
  c) the cross-linked dispersant is not a dispersant which has been cross-linked with bis-ethene,1,1'-[methylene bis(sulfonyl)].

Preferably, the encapsulated pigment has been obtained by a process comprising mixing a pigment, a cross-linkable dispersant, a cross-linking agent and a liquid medium. Optionally, but not necessarily, this step of forming the encapsulated pigment is part of the process according to the first aspect of the present invention.

In this encapsulation process the weight ratio of the pigment to liquid medium is preferably selected to be 1:100 to 1:2.5, more preferably 1:100 to 1:3, especially 1:100 to 1:5. Preferably the weight ratio of the cross-linkable dispersant to the liquid medium used in the encapsulation process is 1:1,000 to 1:2.5, more preferably 1:100 to 1:3.3, especially 1:100 to 1:5.

Typically the weight ratio of cross-linking agent to liquid medium used in the encapsulation process is 1:10,000 to 1:10, more preferably 1:2,000 to 1:20.

Preferably the encapsulation process is performed such that the cross-linking agent is present in the liquid medium at a concentration such that the molar ratio of cross-linking groups in the cross-linking agent to the cross-linkable groups in the cross-linkable dispersant is from 2:1 to 1:20, more preferably, from 1:1 to 1:10 and especially from 0.6:1 to 1:10.

Thus preferably the encapsulated pigment has been prepared by a process comprising mixing of the following components:
  a) a liquid medium;
  b) pigment in a weight ratio of 1:100 to 1:3, more preferably 1:100 to 1:5;
  c) cross-linkable dispersant in a weight ratio of 1:100 to 1:3.3, more preferably 1:100 to 1:5; and
  d) cross-linking agent in a weight ratio of 1:10,000 to 1:10; more preferably 1:2000 to 1:20;
wherein all weight ratios are relative to the weight of the liquid medium.

The mixing of the pigment, cross-linkable dispersant, cross-linking agent and liquid medium, in order to prepare the cross-linked pigment, may be performed by any suitable method, e.g. mechanical agitation, stirring and so on. Low temperatures for mixing are preferred as this results in lower levels of flocculation and particle size growth of the encapsulated pigment in the liquid medium. Preferably, the mixing is performed at a temperature below 100° C., more preferably below 80° C., especially below 60° C., more especially below 40° C. The lower temperature limit for is determined by the freezing point of the liquid medium and the desired rate of cross-linking but a preferred lower limit is 0° C.

The time for the mixing depends to some extent on the temperature, the reactivity of the cross-linking agent with the cross-linkable dispersant and presence or absence of a catalyst. However, a preferred time is 1 to 24 hours, more preferably 1 to 8 hours. If desired a catalyst may be added to speed up the reaction.

The purification process according to the first aspect of the present invention is preferably performed at a temperature of from 0 to 100° C., more preferably from 0 to 50° C. and especially from 10 to 30° C. Preferably the composition as defined in the process according to the first aspect of the present invention has a pH of 7 to 13, more preferably a pH of 7 to 11, especially when the free dispersant is anionic.

If desired the process of the present invention further comprises a step of pre-purifying the composition by a method other than the present invention before at least some free dispersant is removed by the process of the present invention. For example, such a pre-purification step may comprise filter washing an encapsulated pigment with a liquid medium free from dispersant followed by mixing the washed, encapsulated pigment with a liquid medium.

It is preferred that most or all of the free dispersant is removed by the membrane having the specified relationship between MWC and weight average molecular weight of the dispersant.

The purified compositions prepared by the process of the present invention can used to prepare an ink jet printing ink. In some embodiments such ink jet printing inks demonstrate less kogation problems when printed from a thermal ink jet printer. Kogation is the process by which the thermal resistor in the thermal ink jet printing head becomes coated or contaminated with impurities in the ink. Kogation tends to impair the print quality of the ink jet printer and it may prevent a nozzle from firing properly or at all. Thus, kogation problems may result in missing lines or bands in the final print which develop and worsen with the number of prints.

The purified compositions prepared by the process of the present invention can be used to prepare inks. In some embodiments such inks exhibit improved stability especially improved stability to flocculation and precipitation of the pigment. Such improved stability, when present, can be detected by differences in the ink stability towards storage at elevated temperatures, the presence of salts and/or the presence of organic water-miscible cosolvents in the ink. In some embodiments such inks provide prints having improved optical density. The improvement in optical density, when present, tends to be more pronounced on plain paper.

According to a second aspect of the present invention there is provided a purified composition comprising a liquid medium, the encapsulated pigment and less than 5,000 ppm more preferably less than 1000 ppm, especially less than 500 ppm and most especially less than 100 ppm by weight of free dispersant, based on the weight of all the components other than the encapsulated pigment.

A preferred method for measuring the amounts of remaining free dispersant relative to all the components other than the encapsulated pigment comprises the steps i) to iii) in the order:

i) ultra-centrifuging a sample of the purified composition obtainable by the process according to the first aspect of the present invention and thereby separating the liquid medium containing any remaining free dispersant from the encapsulated pigment;

ii) removing just the liquid medium containing the free dispersant from the ultra-centrifuged sample prepared in step i);

iii) measuring the amounts of free dispersant in the liquid medium removed in step ii).

Step i) is preferably preformed using high speed air centrifuges.

Step ii) is preferably performed by decanting or pipetting out the liquid medium containing the free dispersant without the encapsulated pigment.

Step iii) is preferably performed by Gel Permeation Chromatography (GPC) using an refractive index detector.

Preferably, the composition according to the second aspect of the present invention is obtained by the process according to the first aspect of the present invention.

A convenient method to monitor the purity of the composition is to measure the amounts of free dispersant in the permeate and to continue the process of the present invention until the permeate has less than the above mentioned amounts of free dispersant. Suitable method for measuring the amount of the free dispersant in the permeate include High Performance Liquid Chromatography, conductivity and gravimetry. The amount of free dispersant can be approximately established by preparing a calibration curve which plots the amount of dispersant prior to cross-linking in ppm against the above properties such as conductivity.

Hitherto we have found that low levels of free dispersant such as these have been especially difficult to achieve when cross-linkable dispersants having high molecular weights (as described hereinbefore) have been used to encapsulate pigments.

The amount of free dispersant present in the composition after the process of the present invention has been performed depends to some extent on the contact time between the membrane and the composition. Generally speaking longer contact times result in more free dispersant being removed.

The process optionally further comprises the step of adding liquid medium free from dispersant to the composition in order to replace liquid medium lost through the membrane as permeate. In this embodiment the encapsulated pigment is preferably washed with at least 5 times, more preferably at least 10 times and especially at least 20 times the volume of a the composition using liquid medium free from dispersant.

Preferably the liquid medium free from dispersant is water, especially pure water. Water may be purified by, for example, distillation, deionizer resin, reverse osmosis or the like.

The process according to the first aspect of the present invention may also comprise the step of removing some or all of the liquid medium from the composition. Some of the liquid medium may be conveniently removed from the composition by not replacing all or part of the liquid medium lost as permeate during the purification process. This embodiment has the advantage of providing concentrates and "dry" compositions for more economic transportation.

According to a third aspect of the present invention there is provided a process for preparing an ink comprising the step of mixing one or more ink additives with a composition according to the second aspect of the present invention or with a composition obtained by a process according to the first aspect of the present invention.

Preferred ink additives are water-miscible organic liquids, surfactants, anti-kogation agents, anti-foaming agents, viscosity modifiers, biocides, corrosion inhibitors, anti-cockle agents, buffers, dyes and/or binders.

Preferably, said ink additives comprise at least one water-miscible organic solvent, more preferably at least one water-miscible organic solvent and at least one surfactant.

Inks containing encapsulated pigments made by a process according to the third aspect of the present invention often have good optical density, especially when the amounts of free dispersant are very low.

According to a fourth aspect of the present invention there is provided an ink comprising a composition according to the second aspect of the present invention or comprising a composition obtained by the process according to the first aspect of the present invention.

Preferably, the ink has a viscosity of less than 50 mPa·s, more preferably less than 30 mPa·s and especially less than 10 mPa·s when measured at a temperature of 25° C.

Preferably, the viscosity is measured by a Bohlin rheometer using a cone and plate geometry. Preferably the viscosity is measured at a rotational velocity of 10 rpm. Preferably the viscosity of the ink is substantially Newtownian.

Preferably, the ink has been centrifuged or filtered through a filter to remove particulate matter therefrom that might otherwise block the fine nozzles used in ink jet print heads. Suitable filters have an average pore size of less than 10 microns, more preferably less than 5 microns and especially less than or equal to 1 micron. Preferably the ink has been filtered through a filter having an average pore size of from 10 to 0.5 microns, more preferably from 5 to 0.5 microns and especially from 2 to 0.5 microns.

According to a fifth aspect of the present invention there is provided a process for printing an image on a substrate comprising applying an ink according to the fourth aspect of the present invention to the substrate. Preferably the printing is by means of an ink jet printer.

According to a sixth aspect of the present invention there is provided a substrate printed with an ink according to the fourth aspect of the present invention.

According to a seventh aspect of the present invention there is provided a cartridge comprising a chamber and an ink wherein the ink is in the chamber and the ink is according to the fourth aspect of the present invention.

According to a eighth aspect of the present invention there is provided a printer comprising a cartridge wherein the printer cartridge is according to the seventh aspect of the present invention. Preferably, the printer is an ink jet printer.

EXAMPLES

The present invention will now be illustrated by the following non-limiting examples in which all parts are by weight unless specified otherwise.

Preparation of Cross-Linkable Dispersant (1)

A monomer feed composition was prepared by mixing methacrylic acid (236 parts), methyl methacrylate (413 parts), 2-ethylhexylmethacrylate (350 parts) and isopropanol (375 parts). An initiator feed composition was prepared by mixing 2,2'-azobis(2-methylbutyronitrile) (22.05 parts) and isopropanol (187.5 parts).

Isopropanol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 2 hours. The reactor vessel contents were maintained at 80° C. for a further 4 hours before cooling to 25° C. The dispersant was then isolated from the reactor vessel contents by rotary evaporation under reduced pressure. This was designated as Dispersant (1). Dispersant (1), was an acrylic copolymer which had a number average molecular weight of 17,119, a weight average molecular weight of 30,048 and a polydispersity of 1.75 as measured by GPC.

Dispersant (1)

Dispersant (1) (150 parts) was dissolved in water (470 parts) and neutralised with potassium hydroxide aqueous solution to give an aqueous solution of pH 8.7 which was designated as Dispersant solution (1).

Mill-Base (1)

Sunfast Cyan™ pigment (260 parts) was mixed with Dispersant solution (1) (117 parts) and water (221 parts). Sunfast Cyan™ is a commercial grade of C.I. Pigment Blue 15:4. The mixture was milled in a Mini-Zeta mill for a period of 3 hours. This resulted in a mill-base designated as Mill-base (1) comprising the milled pigment having a d90 volume average particle size of 101 nm, a d50 volume average particle size of 76 nm, a pH of 9.7 and a pigment content of 15% by weight.

Composition (1)

Polyethylene glycol diglycidyl ether (a cross-linking agent) (1.89 parts supplied by Aldrich) in water (1 part) was slowly added to Mill-base (1) (150 parts) at a temperature of about 25° C., the resultant mixture was then heated and stirred for 6 hours at a temperature of 40 to 50° C. The pH of the mixture during the cross-linking reaction was about 10. The resultant encapsulated pigment dispersion was designated as Composition (1).

Removal of at Least Some Free Dispersant

Composition (1) comprising encapsulated pigment, liquid medium and free dispersant was ultrafiltered using a Whatman Ultran Miniflex™ membrane unit fitted with a polyether sulphone membrane having a molecular weight cut-off of 300,000 Daltons. This MWC corresponds to approximately 10 times the weight averaged molecular weight of the dispersant prior to cross-linking (30,048). 10 volumes of deionized water were used in the ultrafiltration process. This resulted in a purified encapsulated pigment composition which was designated as PEPD (1) which had much less free dispersant than Composition (1).

Inks

The inks described in Tables I and II may be prepared containing encapsulated pigments purified by the present invention. Numbers quoted in the columns refer to the number of parts of the relevant component and all parts are by weight. The first column indicates the number of parts of PEPD (1) by weight based on the amount of solid encapsulated pigment. The inks may be applied to paper by thermal or piezo ink jet printing.

The following abbreviations are used in Table I and II:

| | |
|---|---|
| PG = | propylene glycol |
| DEG = | diethylene glycol |
| NMP = | N-methyl pyrrolidone |
| DMK = | dimethylketone |
| IPA = | isopropanol |
| MEOH = | methanol |
| 2P = | 2-pyrrolidone |
| MIBK = | methylisobutyl ketone |
| P12 = | propane-1,2-diol |
| BDL = | butane-2,3-diol |
| CET = | cetyl ammonium bromide |
| PHO = | $Na_2HPO_4$ |
| TBT = | tertiary butanol |
| TDG = | thiodiglycol |

TABLE I

| PEPD (1) Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 | | 6 | 4 | | | | | 5 | |
| 3.0 | 90 | | 5 | 5 | | 0.2 | | | | | |
| 10.0 | 85 | 3 | | 3 | 3 | | | | 5 | 1 | |
| 2.1 | 91 | | 8 | | | | | | | | 1 |
| 3.1 | 86 | 5 | | | | | 0.2 | 4 | | | 5 |
| 1.1 | 81 | | | 9 | | 0.5 | 0.5 | | | 9 | |
| 2.5 | 60 | 4 | 15 | 3 | 3 | | | 6 | 10 | 5 | 4 |
| 5 | 65 | | 20 | | | | | 10 | | | |
| 2.4 | 75 | 5 | 4 | | 5 | | | | 6 | | 5 |
| 4.1 | 80 | 3 | 5 | 2 | 10 | | 0.3 | | | | |
| 3.2 | 65 | | 5 | 4 | 6 | | | 5 | 4 | 6 | 5 |
| 5.1 | 96 | | | | | | | | 4 | | |
| 10.8 | 90 | 5 | | | | | | 5 | | | |
| 10.0 | 80 | 2 | 6 | 2 | 5 | | | 1 | | 4 | |
| 1.8 | 80 | | 5 | | | | | | | 15 | |
| 2.6 | 84 | | | 11 | | | | | | 5 | |
| 3.3 | 80 | 2 | | | 10 | | | | 2 | | 6 |
| 12.0 | 90 | | | 7 | | 0.3 | | 3 | | | |

TABLE I-continued

| PEPD (1) Content | Water | PG | DEG | NMP | DMK | NaOH | Na Stearate | IPA | MEOH | 2P | MIBK |
|---|---|---|---|---|---|---|---|---|---|---|---|
| 5.4 | 69 | 2 | 20 | 2 | 1 | | | | | 3 | 3 |
| 6.0 | 91 | | | 4 | | | | | | 5 | |

TABLE II

| PEPD (1) Content | Water | PG | DEG | NMP | CET | TBT | TDG | BDL | PHO | 2P | PI2 |
|---|---|---|---|---|---|---|---|---|---|---|---|
| 3.0 | 80 | 15 | | | 0.2 | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | 5 | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 10.0 | 91 | | | 6 | | | | | | 3 | |
| 9.0 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | 10 | | | | | | | | |
| 2 | 88 | | | | | | 10 | | | | |
| 5 | 78 | | | 5 | | | 12 | | | 5 | |
| 8 | 70 | 2 | | 8 | | | 15 | | | 5 | |
| 10 | 80 | | | | | | 8 | | | 12 | |
| 10 | 80 | | 10 | | | | | | | | |

The invention claimed is:

1. A process for purifying a composition comprising:
   i) an encapsulated pigment comprising a pigment and an encapsulant material comprising a cross-linked dispersant;
   ii) a liquid medium; and
   iii) free dispersant;
   said process comprising removal of at least some free dispersant from the composition using a membrane having a molecular weight cut-off of 3 to 30 times the weight average molecular weight of the dispersant prior to cross-linking,
   with the proviso that at least one of conditions a), b) and c) are met:
   a) the pigment is not silicon dioxide;
   b) the cross-linked dispersant is not cross-linked polyethyleneimine; and
   c) the cross-linked dispersant is not a dispersant which has been cross-linked with bis-ethene,1,1'-[methylene bis (sulfonyl)]
   wherein prior to cross-linking the dispersant is polymeric and has a weight averaged molecular weight of from 5,000 to 100,000.

2. A process according to claim 1 wherein the pigment is not silicon dioxide.

3. A process according to claim 1 wherein the membrane has molecular weight cut-off of 5 to 20 times the weight average molecular weight of the dispersant prior to cross-linking.

4. A process according to claim 1 wherein the membrane has a molecular weight cut-off no more than 1,000,000 and a pore size no more than 0.3 microns.

5. A process according to claim 1 wherein the encapsulated pigment has a d90 volume average particle size of 50 nm to 200 nm.

6. A process according to claim 1 wherein the membrane has a molecular weight cut-off of 50,000 to 1,000,000.

7. A process according to claim 1 wherein the dispersant has a weight averaged molecular weight of from 5,000 to 70,000 prior to cross-linking.

8. A process according to claim 1 wherein the dispersant has a weight averaged molecular weight of 10,000 to 50,000 prior to cross-linking.

9. A process according to claim 1 wherein most or all of the free dispersant is removed using the membrane.

10. A process according to claim 1 wherein the membrane is or comprises a polyether sulfone or polysulfone material.

11. A process according to claim 1 which further comprises a step of pre-purifying the composition by a process before removing at least some of the free dispersant from the composition by the claimed process.

* * * * *